(12) United States Patent
Kahr et al.

(10) Patent No.: US 8,365,884 B2
(45) Date of Patent: Feb. 5, 2013

(54) RAILWAY BRAKE SHOE

(75) Inventors: Joseph C. Kahr, Southern Pines, NC (US); Timothy A. Rumph, Laurinburg, NC (US)

(73) Assignee: RPFC Holding Corp., Wilmerding, PA (US)

( * ) Notice: Subject to any disclaimer, the term of this patent is extended or adjusted under 35 U.S.C. 154(b) by 366 days.

(21) Appl. No.: 12/598,798

(22) PCT Filed: May 29, 2007

(86) PCT No.: PCT/US2007/069854
§ 371 (c)(1),
(2), (4) Date: Apr. 14, 2010

(87) PCT Pub. No.: WO2008/150286
PCT Pub. Date: Dec. 11, 2008

(65) Prior Publication Data
US 2010/0224453 A1    Sep. 9, 2010

(51) Int. Cl.
F16D 65/04    (2006.01)
F16D 69/04    (2006.01)

(52) U.S. Cl. ............... 188/248; 188/251 R; 188/250 B; 188/250 D; 188/250 F

(58) Field of Classification Search ............... 188/248, 188/250 F, 250 B, 250 R, 250 H, 250 D, 188/251 R
See application file for complete search history.

(56) References Cited

U.S. PATENT DOCUMENTS

| 412,572 | A | 10/1889 | Whalen et al. |
|---|---|---|---|
| 995,067 | A | 6/1911 | Jones |
| 1,025,219 | A | 5/1912 | Thompson |
| 1,639,256 | A | 8/1927 | Christianson et al. |
| 1,749,760 | A | 3/1930 | Duncan |
| 2,266,984 | A | 12/1941 | Moore |
| 2,660,267 | A | 11/1953 | Sweger et al. |
| 2,885,037 | A | 5/1959 | Wilson |
| 2,933,164 | A | 4/1960 | Baechtel |
| 2,948,361 | A | 8/1960 | Pogue |
| 4,781,275 | A | 11/1988 | Olsen |
| 5,429,215 | A | 7/1995 | King |
| 5,560,453 | A | 10/1996 | Conrad |
| 5,794,740 | A | 8/1998 | Velayutha et al. |

(Continued)

FOREIGN PATENT DOCUMENTS

| JP | 10030661 A | 2/1998 |
|---|---|---|
| RU | 52957 U1 | 4/2006 |

(Continued)

OTHER PUBLICATIONS

"Train-stop and pneumatic equipment of rail transport equipment", Asssocated Hardware Catalog, Moscow, ASTO Association, 2003, pp. 150-153.

*Primary Examiner* — Thomas J Williams
(74) *Attorney, Agent, or Firm* — The Webb Law Firm

(57) ABSTRACT

A brake shoe without a metal backing has a metal insert (9) comprising a main body (10), two wing-like extensions (12/13) integral with, on opposite sides of and extending away from the main body having back faces adjacent to the back surface of the brake shoe, two generally parallel radially extending flanges (15/16) integral with the main body and/or the wing-like extensions. The parallel extension defines a keyway (17), wherein when the brake shoe is emplaced on the brake head, the keyway extends through an opening provided in the brake head.

11 Claims, 10 Drawing Sheets

U.S. PATENT DOCUMENTS

| | | |
|---|---|---|
| 6,241,058 B1 | 6/2001 | Shute et al. |
| 6,302,247 B1 | 10/2001 | Kahr et al. |
| 6,336,532 B1 | 1/2002 | Samolowicz |
| 6,581,732 B1 | 6/2003 | Shute et al. |
| 6,588,553 B1 | 7/2003 | Wirth |
| 8,267,229 B2 * | 9/2012 | Kahr et al. ............... 188/251 R |
| 2002/0079174 A1 | 6/2002 | Shute et al. |
| 2003/0234142 A1 | 12/2003 | Shute et al. |
| 2003/0234143 A1 | 12/2003 | Shute et al. |
| 2011/0132705 A1 * | 6/2011 | Rumph et al. ............... 188/234 |

FOREIGN PATENT DOCUMENTS

| | | |
|---|---|---|
| RU | 2298499 C1 | 5/2007 |
| SU | 518403 A1 | 6/1976 |

* cited by examiner

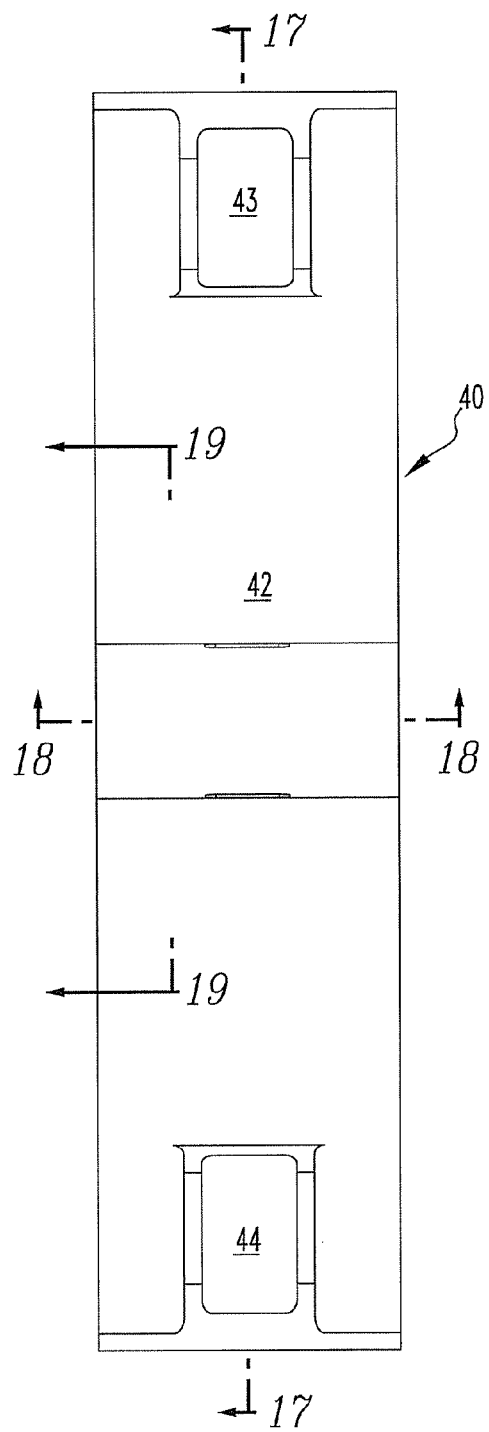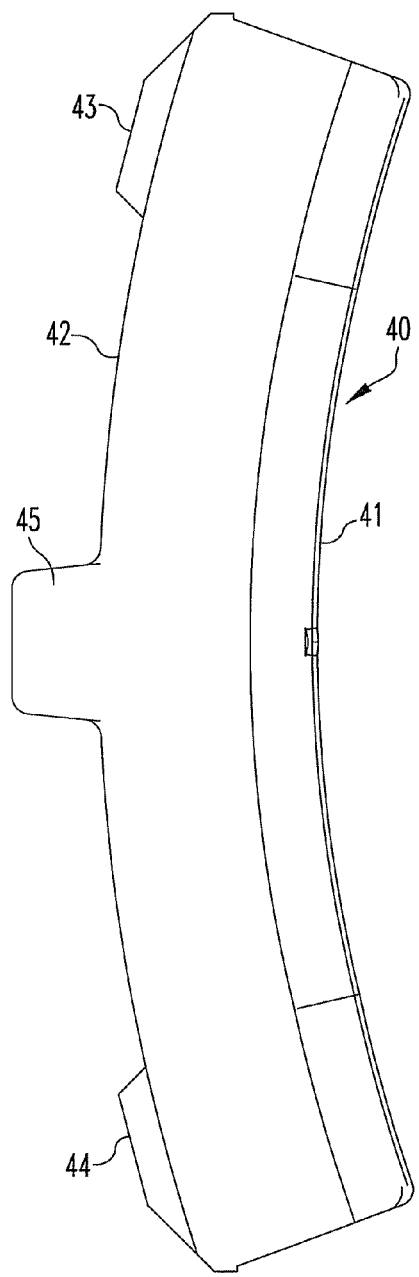
FIG.14
FIG.15

RAILWAY BRAKE SHOE

BACKGROUND OF THE INVENTION

1. Field of the Invention

This application is directed to the art of composite railway brake shoes.

2. Description of Related Art

Rail cars are supported and guided by steel wheels. The treads at the outer circumference of the wheels ride over steel rails. Rail car brakes comprise brake shoes that are brought into frictional engagement with the wheel treads. The brake shoes are supported by brake heads which, in turn, are moveably supported by the brake rigging comprised of a system of levers and a pneumatic cylinder. Brake shoes are comprised of various materials that are selected for their frictional characteristics and for the effect on the wear life of the wheel treads. Many brake shoes are composites of materials having different characteristics. In typical composite brakes shoes, materials of differing frictional characteristics bear upon the wheel tread during braking. This may be achieved by placing inserts of a different material into the friction face of the shoe comprised of the principal brake shoe material.

Standard railway brake shoes in North America are produced with metal backing plates for support of the friction material and for attachment and retention of the brake shoes to the brake heads. One type of railway brake shoe also includes a metallic insert solidly affixed by welding to the metal backing plate before the brake pad is formed, for example, by molding, onto the backing plate. See U.S. Pat. No. 6,241,058 entitled "Brake Shoe With Insert Bonded to Backing Plate." The brake shoe friction material often comprises a blend of abrasive materials, organic and inorganic filler materials, and resins. The metallic insert may be selected to provide beneficial treatment of the rolling surface of the wheel.

Elsewhere in the world, brake shoes are produced without metal backing plates and normally include a skeletal wire frame. As a result, it is difficult or not possible to obtain the benefits of a metal insert due to the lack of an adequate means for support and retention of the metal insert.

SUMMARY OF THE INVENTION

It is an advantage of this invention to provide a metal insert uniquely configured for use in brake shoes without metal backing plates and brakes shoes incorporating the metal insert. It is an additional advantage of this invention to provide metal inserts that may be used with brake shoes with and without wire frame supports.

Brake shoes have a friction surface which during braking bears on the convex rolling surface of the rail vehicle wheel. The rolling surface of the wheel is a surface of rotation that may be a convex-conical surface or a combination of convex-conical and cylindrical surfaces or other surfaces of rotation. The surface of the brake shoe has a concave surface of rotation that matches a portion of the convex surface of the wheel. These surfaces of rotation are defined by a generatrix (not necessarily straight line) rotated around an axis which is defined by the wheel axle. Thus, the friction surface of the brake shoe has a generally axial and a circumferential extent and the brake shoe has a radial thickness moving away from the friction surface. The features of the metal inserts and brake shoes according to various embodiments of this invention will be described herein with reference to the generally axial, circumferential and radial directions.

Briefly, according to one embodiment of this invention, a brake shoe without a metal backing is provided. The brake shoe is defined by a friction surface for bearing upon a wheel tread and an opposed back surface for being placed in contact with and secured to a brake head. The brake shoe has a metal insert comprising a main body having a face lying in the friction surface of the brake shoe. The main body extends radially away from the friction surface and extends to the back surface of the brake shoe. Two wing-like extensions are integral with, on opposite sides of and extending away from the main body of the metal insert having faces adjacent to the back surface of the brake shoe. Two generally parallel and radially extending flanges are integral with the main body and/or the wing-like extensions. The parallel extensions are sized to extend beyond the back surface of the brake shoe defining a keyway. When the brake shoe is emplaced on the brake head, the keyway extends through an opening provided in the brake head. The keyway provides a structure for securing the brake shoe to the brake head. The metal insert is embedded, as by molding, in the friction material.

According to a further embodiment, a bridge is provided across the radial ends of the parallel flanges of the insert to provide a closed keyway. According to yet another embodiment, the wing-like extensions and the main body have an opening therethrough for the passage of friction material. Thus, the friction material is not completely interrupted by the insert positioned between both circumferential (longitudinal) ends of the brake shoe thereby holding both ends together.

According to yet another embodiment, the brake shoe has a wire frame that cooperates with the metal insert to provide additional resistance to bending and cracking. The wire frame is configured so that the metal insert nests within the central portions of the wire frame. The wire frame has two cantilevered portions each of which extend circumferentially (laterally) from the metal insert beyond the extent of the wing-like extensions of the metal insert. The wire frame has two short parallel sections that are positionable along the metal insert adjacent the wing-like extensions. The short parallel sections are connected to cantilevered sections on the opposite side of the metal insert. Arcuate sections at opposite ends of the metal insert connect the short sections and the cantilevered sections. The arcuate sections supporting different cantilevered sections cross and are welded together where they cross. The short sections and the arcuate sections form a nest for the metal insert. The metal insert and wire frame are embedded as by molding in the friction material. According to one embodiment, the wire frame may be welded to the metal insert.

According to a still further embodiment, a metal insert for a brake shoe is provided. The brake shoe is defined by a friction surface for bearing upon a wheel tread and an opposed back surface for being placed in contact with and secured to a brake head. The metal insert comprises a main body having a friction face for lying in the friction surface of a brake shoe. The main body extends radially away from the friction face. Two wing-like extensions integral with, on opposite sides of and extending away from the main body, have back faces for being positioned adjacent to the back surface of the brake shoe. Two generally parallel radially extending flanges are integral with the main body and/or the wing-like extensions. The parallel extensions are sized for extending beyond the back surface of a brake shoe defining a keyway.

BRIEF DESCRIPTION OF THE DRAWINGS

Further features and other objects and advantages of this invention will become apparent from the following description of preferred embodiments made with reference to the drawings in which:

FIGS. 14, 15 and 16 are plan, elevation and side views of one embodiment of a brake shoe with a metal insert according to this invention;

DESCRIPTION OF THE PREFERRED EMBODIMENTS

Figure 1:
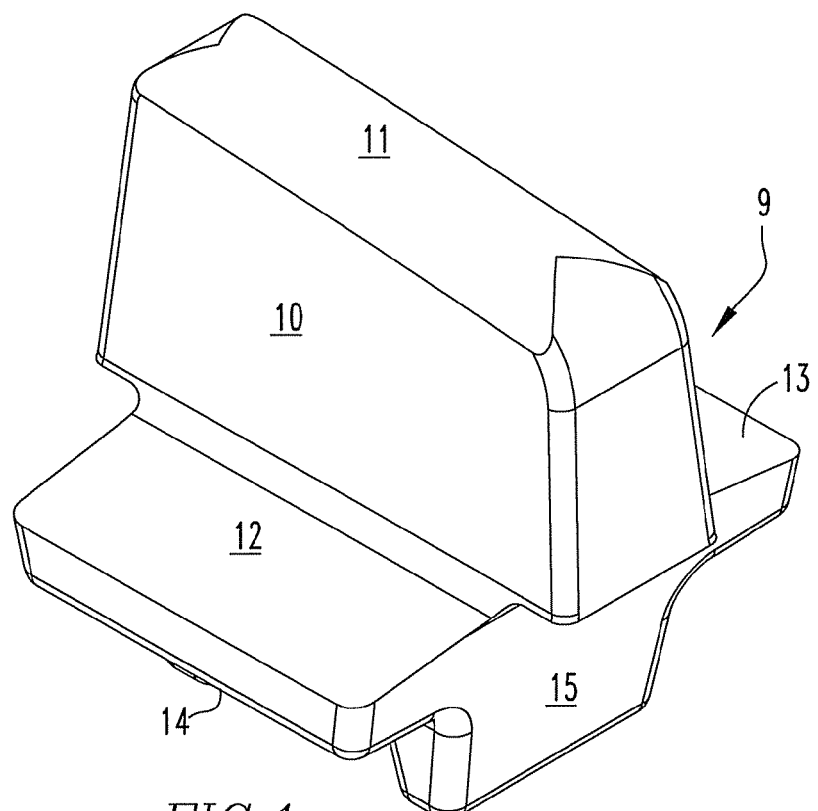
FIG. 1 is a perspective view of one embodiment of a brake shoe insert according to this invention.
Figure 2:
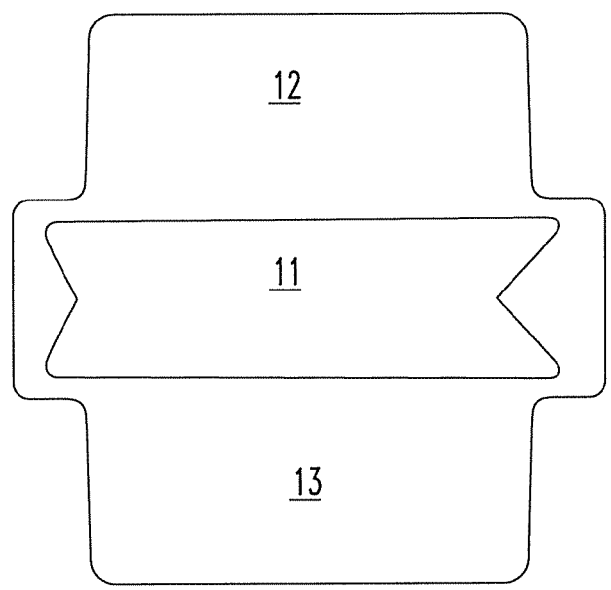
FIGS. 2, 3 and 4 are plan, elevation and side views, respectively, of the insert shown in FIG. 1.
Figure 4:
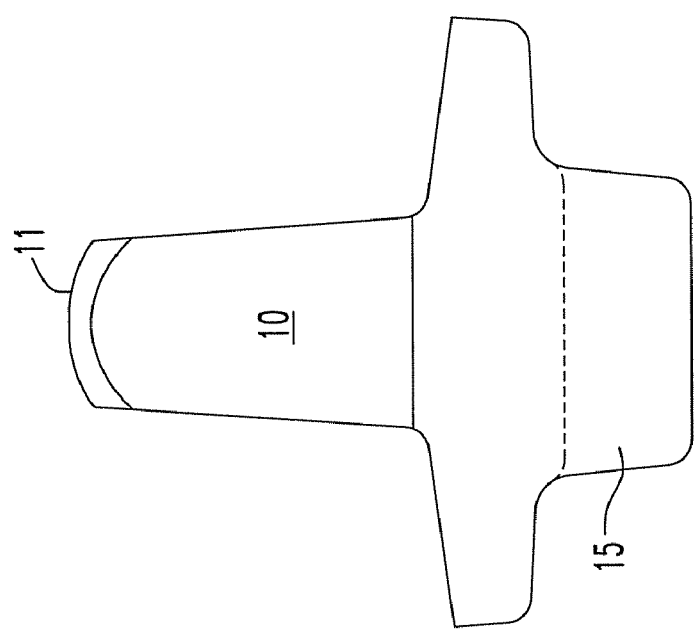
Figure 3:
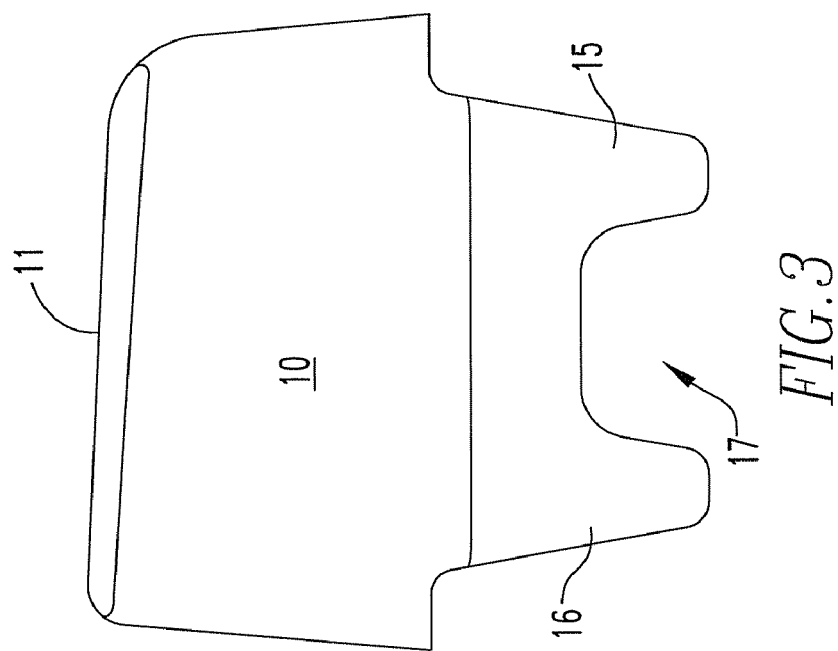
Figure 5:
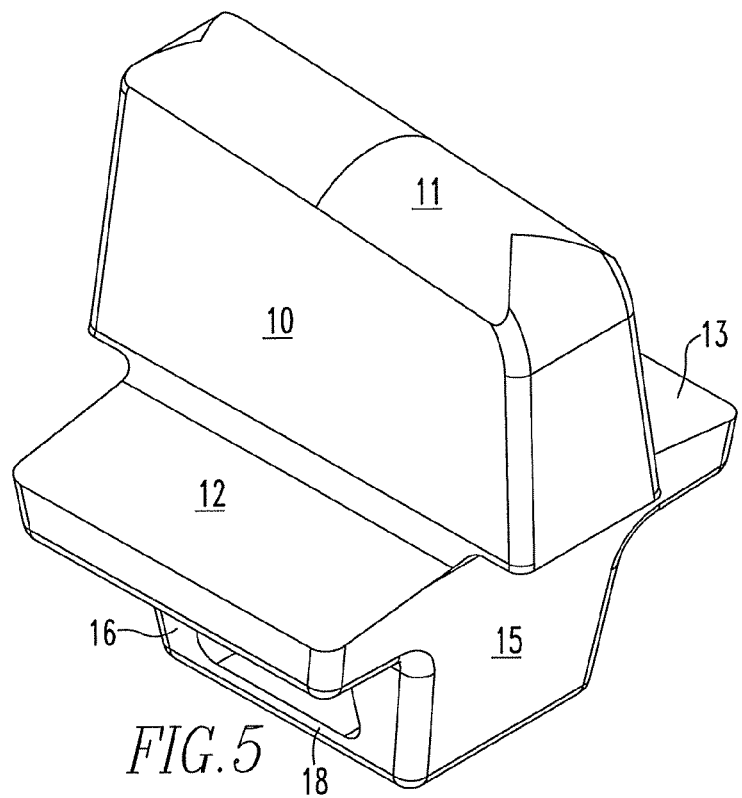
FIG. 5 is a perspective view of a second embodiment of a brake shoe insert according to this invention.
Figure 6:
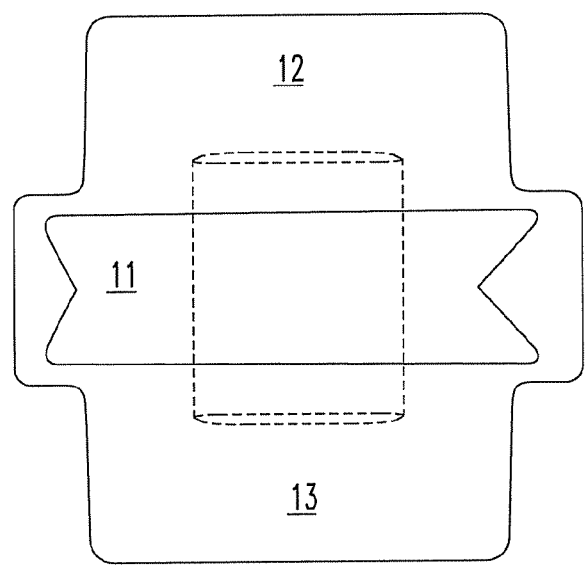
FIGS. 6, 7 and 8 are plan, elevation and side views, respectively, of the brake shoe shown in FIG. 5.
Figure 8:
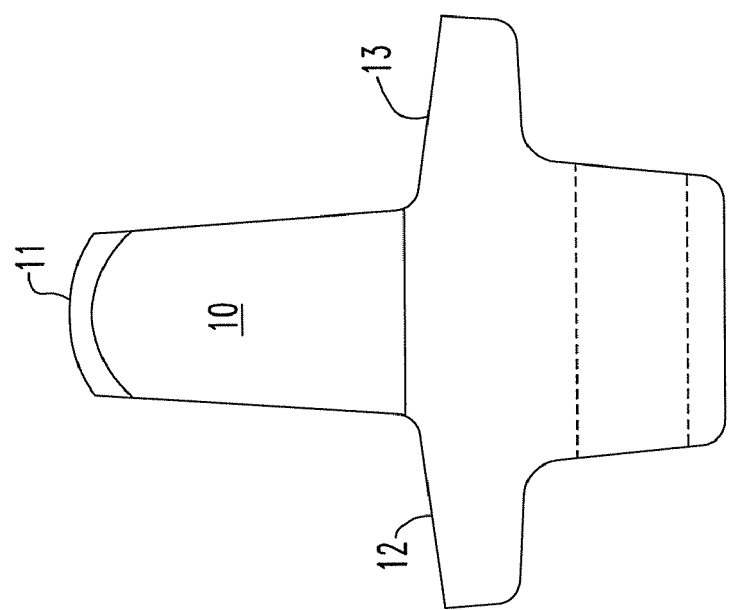
Figure 7:
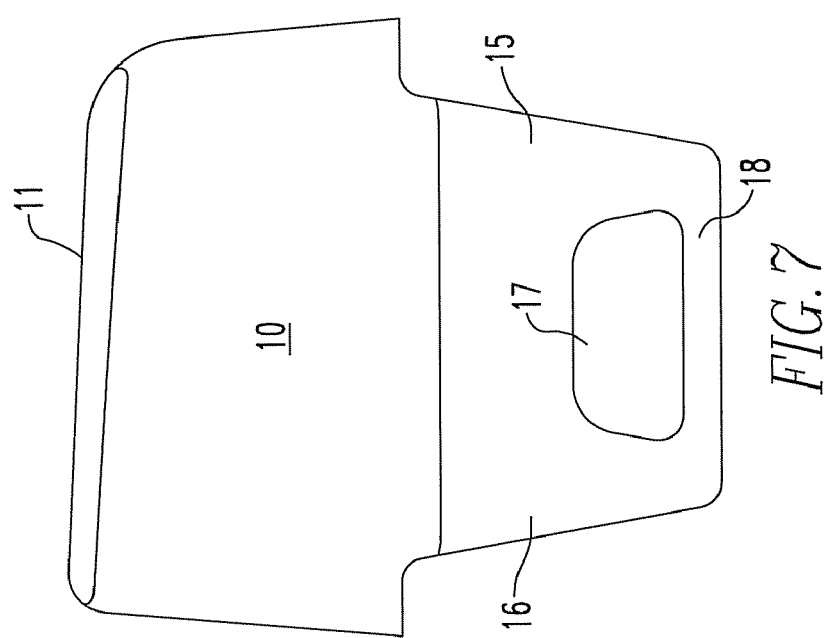
Figure 9:
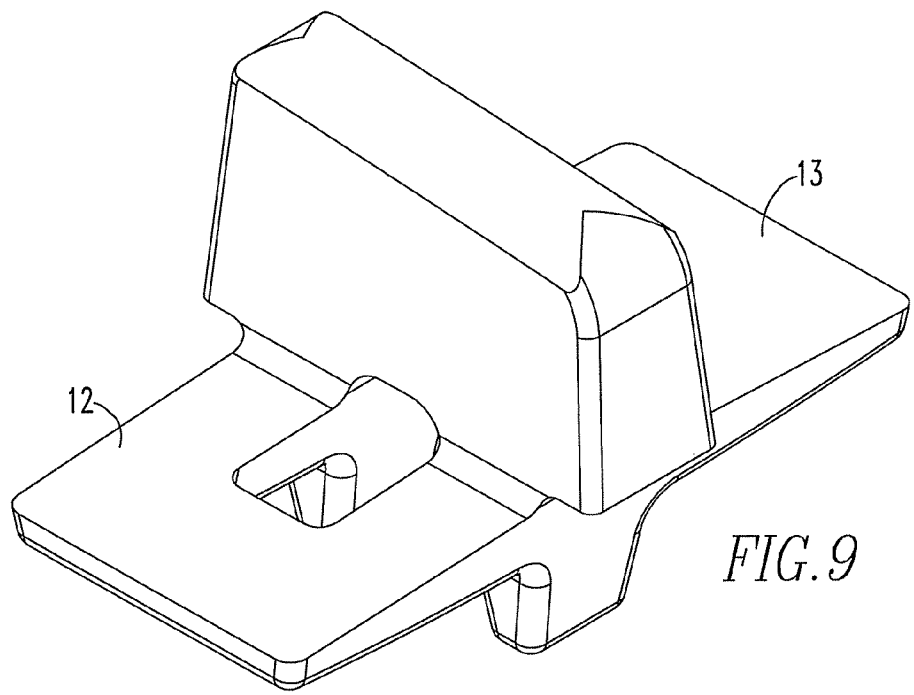
FIG. 9 is a perspective view of a third embodiment of a brake shoe insert according to this invention.
Figure 10:
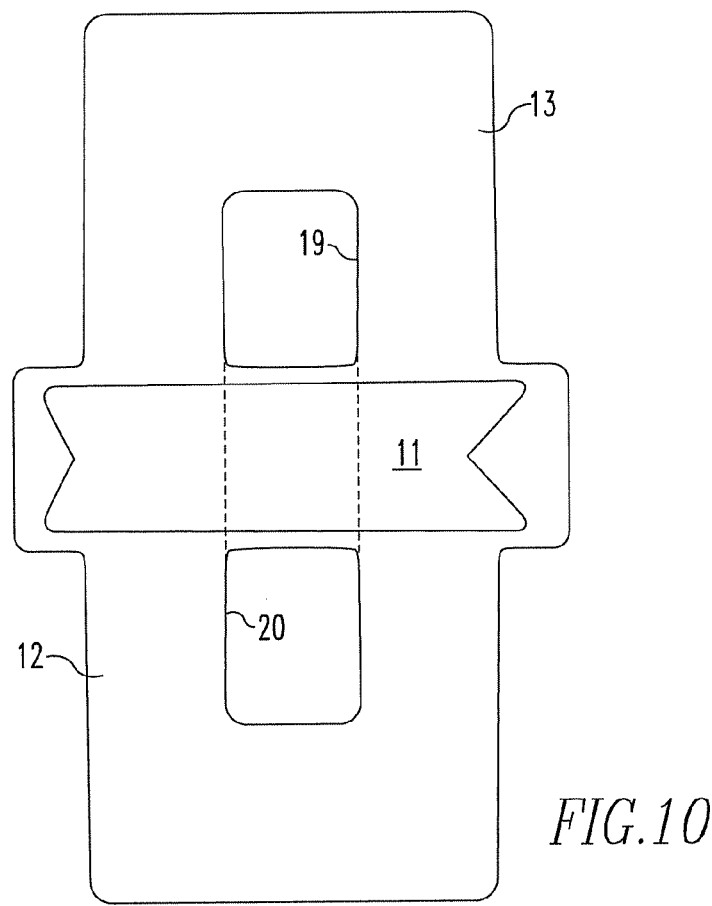
FIGS. 10, 11 and 12 are plan, elevation and side views of the brake shoe insert as shown in FIG. 9.
Figure 12:
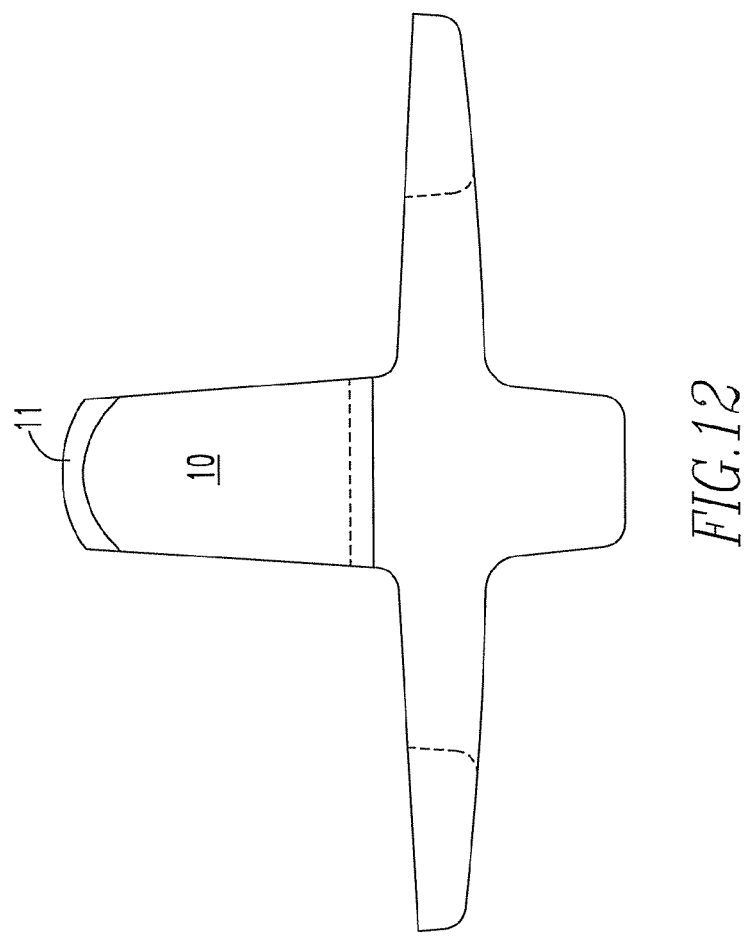
Figure 11:
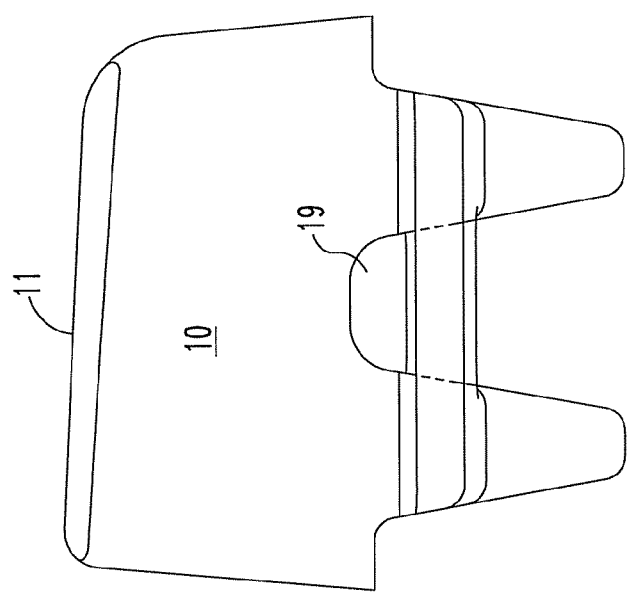

Referring now to FIGS. 1 to 4, there is shown an insert for a brake shoe without a metal backing. A brake shoe is defined by a friction surface for bearing upon a wheel tread and an opposed back surface for being placed in contact with and secured to a brake head. A metal insert 9 comprises a main body 10 having a friction face 11 for lying in the friction surface of a brake shoe. The main body 10 extends away from the friction face. Two wing-like extensions 12, 13 are integral with the main body and on opposite sides of the main body and extending away therefrom. The wing-like extensions have back faces 14 for being positioned adjacent to the back surface of the brake shoe and providing brake head support. Two generally parallel radially extending flanges 15, 16 are integral with the main body 10 and/or the wing-like extensions 12, 13. The parallel flanges 15, 16 are sized for extending beyond the back surface of a brake shoe thus defining a keyway 17.

Referring to FIGS. 5 to 8, there is shown a second embodiment of a metal insert according to this invention. In the description of this and subsequent embodiments, like features have like identifying numerals. The second embodiment differs from the first in having a bridge 18 across parallel flanges 15, 16 to form a closed keyway.

Referring to FIGS. 9 to 12, there is shown a third embodiment of a metal insert according to this invention. The third embodiment differs from the first embodiment in having longer wing-like extensions 12, 13 and openings 19, 20 in the wing-like extensions and the main body for the passage of molding material.

Figure 13:
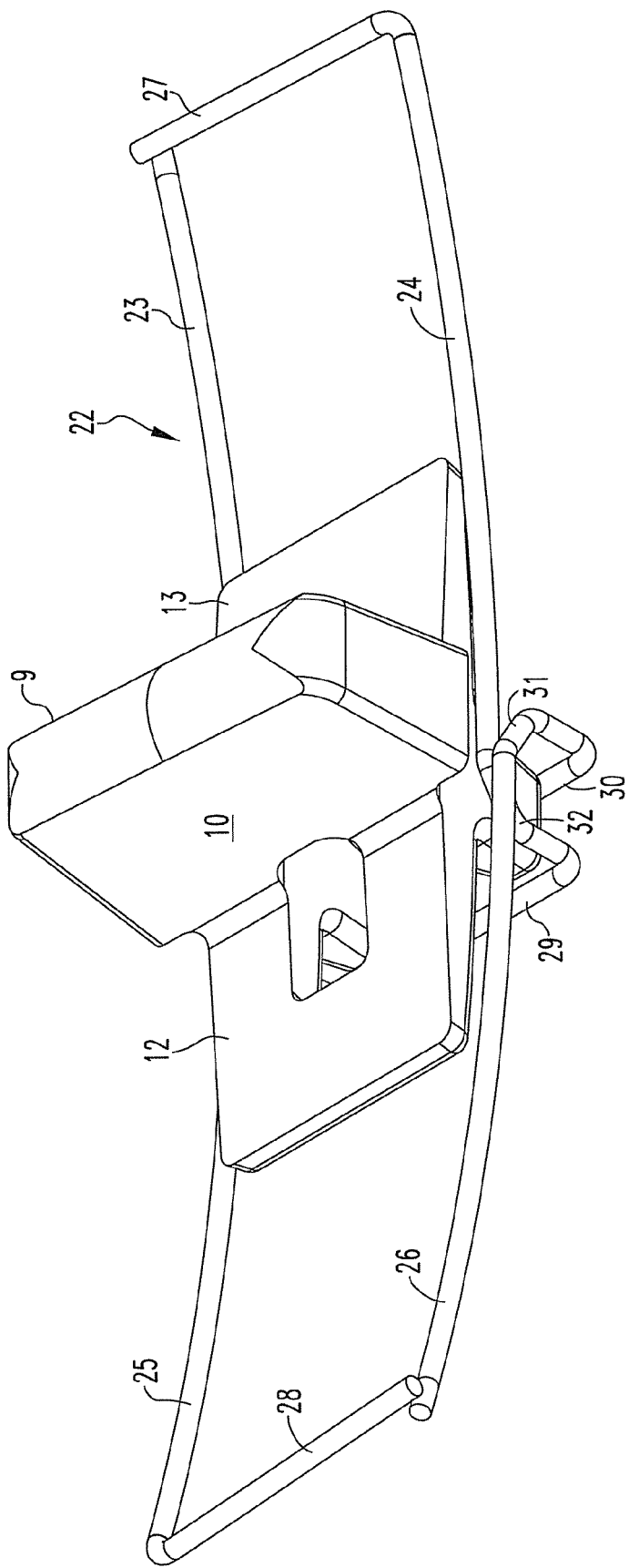
FIG. 13 is a perspective view of a brake shoe insert and associated wire frame for reinforcing a brake shoe.
Figure 16:
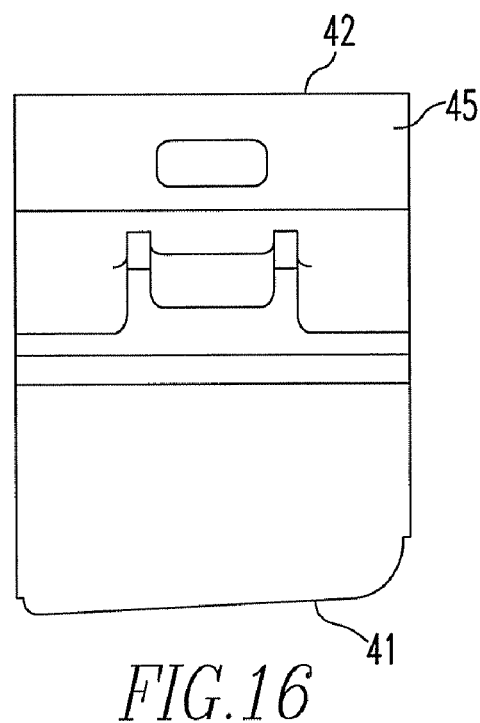
Figure 18:
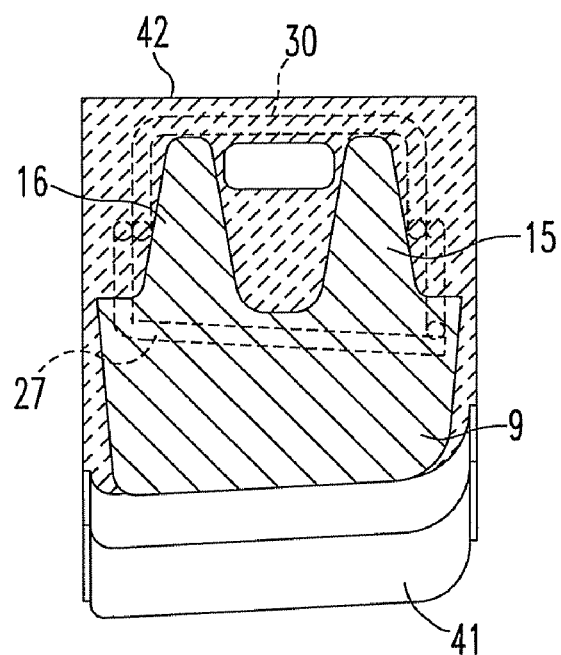
FIG. 18 is a section view taken along line 18-18 of FIG. 14.

Referring to FIG. 13, there is shown a metal insert with an associated wire frame 22. The wire frame has cantilevered legs 23, 24, 25 and 26 extending laterally outward from the main body of the insert generally in the plane of the wing-like extensions. The legs 23 and 24 are connected as the distal ends by a short leg 27. The legs 25 and 26 are connected at the distal ends by a short leg 28. At the proximal ends of legs 23, 24, 25 and 26, the short legs 29, 30 lie along the parallel flanges 15, 16 in the embodiment shown. The short legs 29, 30 are connected to pairs of legs 23, 24, 25 and 26 by arcuate legs 31, 32 (two of four shown) which provide resistance to rotation of the legs 23, 24, 25 and 26 away from the friction surface of the metal insert after the wire frame and insert have been embedded in the brake shoe. The arcuate legs supporting different cantilevered legs cross and are welded together where they cross. The short legs and the arcuate legs form a nest for the metal insert.

Referring now to FIGS. 14 to 19, a brake shoe with embedded metal insert and wire frame is described. A brake shoe 40 has a friction face 41 and a back face 42. The back face is shown to be cylindrical and the friction face conical. Extending from the back face are abutments 43 and 44 which are sized and positioned to enter openings provided in the face of the brake head (not shown). Also extending from the back face is an extension 45 comprising a stirrup that passes through an opening in the face of the brake head and which can be captured to hold the brake shoe to the brake head.

Figure 17:
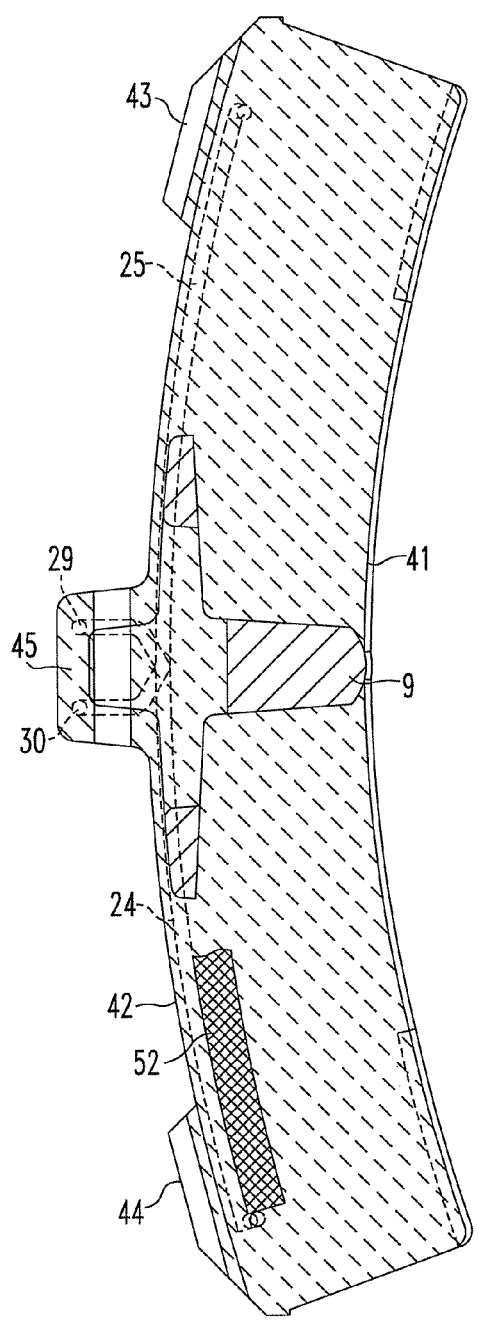
FIG. 17 is a section view taken along line 17-17 of FIG. 14.
Figure 19:
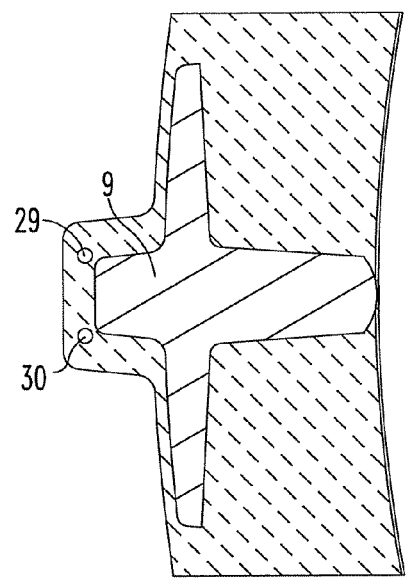
FIG. 19 is a section view taken along line 19-19 of FIG. 14.

Referring to FIG. 17, which is a view of a section taken perpendicular to the wheel axis, it is possible to appreciate the manner in which the metal insert 10 and the wire frame 22 are embedded in a friction material 50. This is also apparent from the section views of FIGS. 18 and 19.

Brake shoes according to this invention are typically formed by molding friction material about the insert and wire frame temporarily held in position in a mold. In one embodiment, the friction material may be added to the mold in one or more stages. Thus, the composition of the friction material may vary from the back to the friction face. The material at the back may be formulated for toughness or for strength and toughness whereas the wearable material of the friction face may be a different material selected for its friction characteristics and wear properties. A reinforcing mesh 52 (see FIG. 17) may be embedded near the back face of the brake shoe. After molding, the friction face may be machined to provide day one contact of the metal insert as well as the friction material.

The herein described embodiments of brake shoes with metal inserts are characterized by resistance to crack formation not withstanding that the metal inserts are not supported by a metal backing plate. Elimination of the backing plate and the welding operation simplifies the manufacture of the brake shoes without sacrificing the advantages of metal inserts. In some applications it is even suitable to eliminate the wire frame.

Having thus described our invention in the detail and particularity required by the Patent Laws, what is desired protected by Letters Patents is set forth in the following claims.

The invention claimed is:

1. A brake shoe, comprising:
   a molded brake shoe body formed of friction material comprised of a blend of abrasive materials, organic and inorganic filler materials, and resins and defining a friction face for bearing upon a wheel tread and an opposed back face; and
   a single piece metal insert molded into the brake shoe body and comprising a substantially vertical main body having a friction face, two wing extensions integral with the main body and on opposite sides of the main body, and two radially extending flanges integral with the main body and extending beyond the back face of the brake shoe body,
   wherein the main body is molded into the brake shoe body such that the two wing extensions are molded within the brake shoe body, the metal insert friction face lies in the brake shoe body friction face for contact with the wheel tread upon wear of the brake shoe body friction face, and the radially extending flanges extending beyond the back face of the brake shoe body.

2. A brake shoe as claimed in claim 1, wherein the wing extensions have back faces positioned adjacent to the back face of the brake shoe body and providing brake head support.

3. A brake shoe as claimed in claim 1, wherein the two radially extending flanges are generally parallel and sized for extending beyond the back face of the brake shoe body to define a keyway.

4. A brake shoe as claimed in claim 3, wherein the radially extending flanges form a closed keyway.

5. A brake shoe as claimed in claim 1, further comprising openings in the wing extensions for the passage of molding material.

6. A brake shoe as claimed in claim 1, further comprising openings in the wing extensions and the main body for the passage of molding material.

7. A brake shoe as claimed in claim 1, wherein the metal insert is nested in a wire frame having cantilevered legs extending away from the metal insert.

8. A brake shoe as claimed in claim 1, wherein the brake shoe body friction face is conical and the back face thereof is cylindrical.

9. A brake shoe as claimed in claim 1, wherein the back face of the brake shoe body comprises abutments sized and positioned to enter openings provided in a face of a brake head.

10. A brake shoe as claimed in claim 1, further comprising an extension extending from the back face of the brake shoe body, the extension comprising a stirrup adapted to pass through an opening in a face of a brake head.

11. A brake shoe as claimed in claim 1, further comprising a reinforcing mesh embedded adjacent the back face of the brake shoe body.

* * * * *

UNITED STATES PATENT AND TRADEMARK OFFICE
CERTIFICATE OF CORRECTION

PATENT NO.       : 8,365,884 B2                                      Page 1 of 1
APPLICATION NO.  : 12/598798
DATED            : February 5, 2013
INVENTOR(S)      : Kahr et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 501 days.

Signed and Sealed this

First Day of September, 2015

Michelle K. Lee
*Director of the United States Patent and Trademark Office*